United States Patent [19]

Tannenläufer et al.

[11] Patent Number: 4,541,611
[45] Date of Patent: Sep. 17, 1985

[54] ARRANGEMENT FOR CONTROLLING AN AIR DUCT

[75] Inventors: Gerd Tannenläufer, Remscheid; Julius Frank, Cologne; Bernhard Forsting, Monchen-Gladbach, all of Fed. Rep. of Germany

[73] Assignee: Ford Motor Company, Dearborn, Mich.

[21] Appl. No.: 538,629

[22] Filed: Oct. 3, 1983

[30] Foreign Application Priority Data

Nov. 15, 1982 [DE] Fed. Rep. of Germany ....... 3242242

[51] Int. Cl.[4] .............................................. F16K 31/44
[52] U.S. Cl. ..................................... 251/228; 251/294; 251/299; 98/2
[58] Field of Search ............... 251/228, 294, 298, 299, 251/147; 98/2.05, 2.06, 2.07, 2.08, 2; 292/262

[56] References Cited

U.S. PATENT DOCUMENTS

| 986,971 | 3/1911 | Fogelsong | 251/147 |
| 1,777,580 | 10/1930 | Russell | 251/298 |
| 2,180,622 | 11/1939 | Vincent | 251/147 |
| 2,325,427 | 7/1943 | Reynolds | 98/2.06 |
| 4,034,622 | 7/1977 | Deck | 251/294 |
| 4,319,664 | 3/1982 | Price et al. | 251/294 |
| 4,390,124 | 6/1983 | Nilsson | 98/2.05 |
| 4,475,324 | 10/1984 | Flakk | 251/299 |

FOREIGN PATENT DOCUMENTS 3001163 7/1981 Fed. Rep. of Germany.

Primary Examiner—Martin P. Schwadron
Assistant Examiner—Sheri Novack
Attorney, Agent, or Firm—Clifford L. Sadler; Daniel M. Stock

[57] ABSTRACT

An arrangement is described for pivoting a flap (5) relative to an air duct (1), as used for example in a vehicle heating and ventilation system. A first actuating element (7a) is connected by film hinge (8) to a base plate (4) on the duct, and a second actuating element (7b) is connected by film hinge (9) to the flap (5). The actuating elements (7a) and (7b) are further hinged to each other along a film hinge (10). Movement of the actuating elements 7a, 7b for example by means of a Bowden cable (12) rotates the closure flap (5) about its film hinge (6).

9 Claims, 9 Drawing Figures

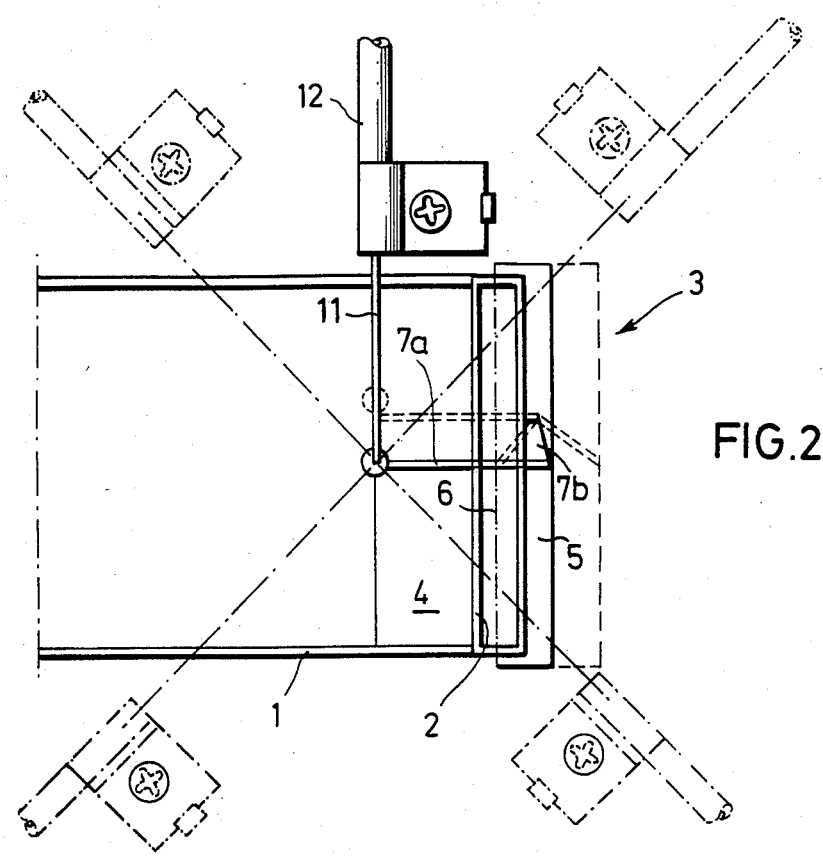
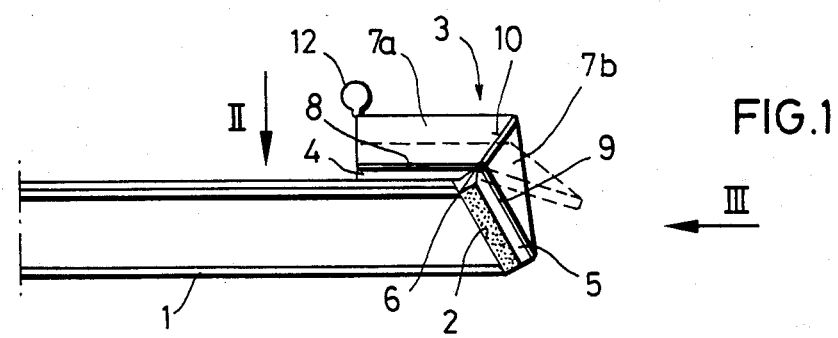
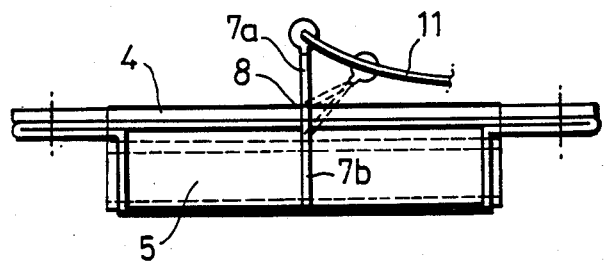

ARRANGEMENT FOR CONTROLLING AN AIR DUCT

BACKGROUND OF THE INVENTION

1. Field of the Invention

The present invention relates to an arrangement for pivoting a flap on an air duct, especially for use in a motor vehicle heating and ventilation system.

2. Description of the Prior Art

In a known arrangement as is described in the German Offenlegungsschrift (Laid-Open Specification) No. 30 01163, the opening of an air duct is controlled by flap parts movably joined by means of film hinges. The flap parts are actuated by a handle, which extends in the direction of the flap and projects from the opening of the air duct.

This known mechanism has the disadvantage that the flap parts are only intended to control the direction of the air stream and an additional conventional "butterfly" flap must be provided for closing the air duct. In addition, connections comprising a bolt passing through a slot are necessary for mounting both the actuating handle and the free ends of the flap parts, in order to ensure mobility. Connections of this type, however, have the disadvantage that they are inclined to rattle where tolerances are too great and to impede movement, during actuation, where tolerances are too narrow.

SUMMARY OF THE INVENTION

According to the present invention, an arrangement for pivoting a flap relative to a duct comprises two actuating elements connected to the flap and the duct, respectively, each pivotable about an axis transverse to the axis of the flap, the two actuating elements being further pivotable relative to one another about a further axis transverse to the axis of the flap, whereby pivoting of the actuating elements serves to pivot the flap relative to the duct.

In this way, it is possible to cause pivotal movement of the two bodies by a movement parallel to the flap axis or along any other direction which is expedient in a particular construction. Moreover, because of the limited amount of movement required, it is possible to use a Bowden cable, for example, as the means for actuation.

Conveniently, each actuating element may be hinged relative to a rib or flange projecting from the surface of the flap or the duct.

Preferably, the flap and the actuating elements are formed integrally from a plastic material, the pivots being constituted by film hinges that is, hinges defined integrally with the adjacent, relatively pivotable parts.

By employing film hinges, it is possible to construct a noise-free arrangement with a minimal amount of assembly.

In one embodiment, the hinge lines of the two actuating elements lie in a plane generally normal to the axis of the flap. In this case, the particularly simple arrangement selected allows the construction of an arrangement at particularly low unit cost.

Alternatively, the plane of the hinge lines may be inclined relative to the axis of the flap. In this case, one or both hinge lines may be obliquely inclined relative to the flap axis. In this case, the oblique mounting of one or other of the actuating elements makes it possible to increase the pivotal range of the flap for a given actuation movement.

BRIEF DESCRIPTION OF THE DRAWINGS

The invention will now be described further, by way of example, with reference to the accompanying drawings, in which:

FIG. 1 is a side view of a flap mechanism according to the invention;

FIG. 2 is a view in the direction of arrow II in FIG. 1;

FIG. 3 is a view in the direction of arrows III in FIG. 1;

DESCRIPTION OF THE PREFERRED EMBODIMENTS

Figure 5:
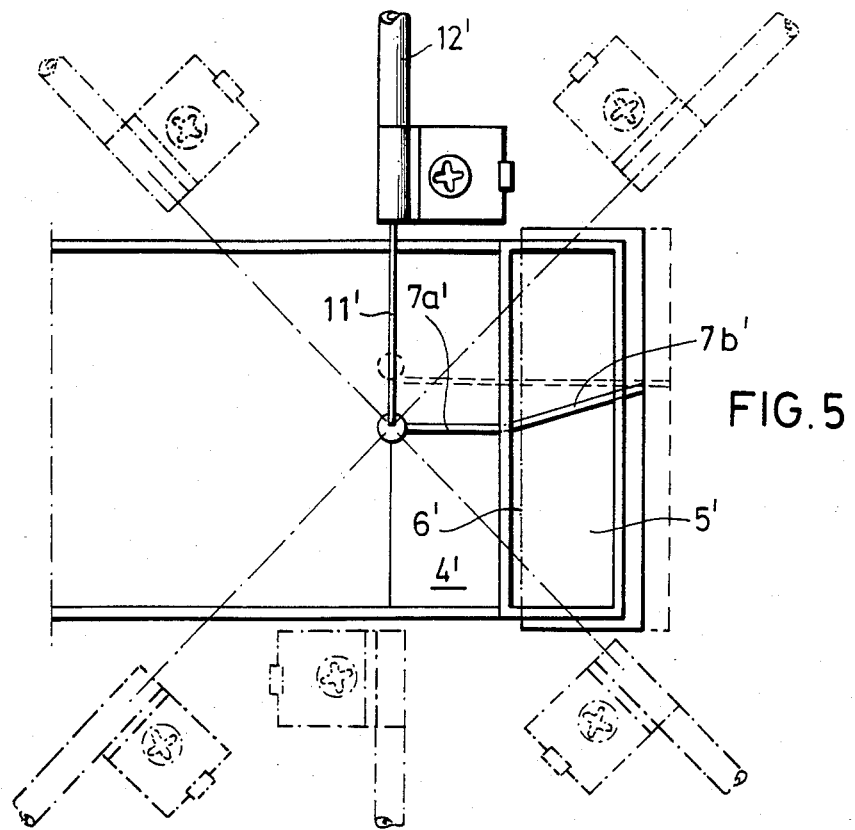
FIG. 5 is a view in the direction of arrow V in FIG. 4.

In FIGS. 1, 2 and 3, an air duct 1 has an end opening 2 closed by a flap arrangement 3, which is shown in solid lines in its closed position and in broken lines in its open position. The flap arrangement 3 comprises a plate 4 joined to the duct 1 and a closure flap 5 which are joined to one another by a film hinge 6 to permit pivotal movement about an axis. A first actuating element 7a is hinged relative to the plate 4 about a film hinge 8, and a second actuating element 7b is hinged relative to the closure flap 5 by a film hinge 9. The two actuating elements are further hinged relative to each other by a film hinge 10.

A control mechanism, such as a Bowden cable in the case of the present embodiment, is disposed laterally with respect to the actuating element 7a and 7b and engages the actuating element 7a. In operation, the inner cable 11 of the Bowden cable 12 is displaced relative to the base plate 4, causing the actuating element 7a to rotate about the film hinge 8. As the actuating element 7b is joined to the actuating element 7a by the film hinge 10, the actuating element 7b is also caused to rotate about its respective film hinge 9 causing the closure flap either to open or to close depending on the particular rotation performed by the actuating element 7a.

Several alternative positions of the Bowden cable 12 are shown chain-dotted in FIG. 2. It is a particular advantage of the invention that it allows such flexibility in the location of the Bowden cable 12.

Further alternative embodiments of the invention are illustrated in FIGS. 4 to 6 and 7 to 9.

Figure 4:
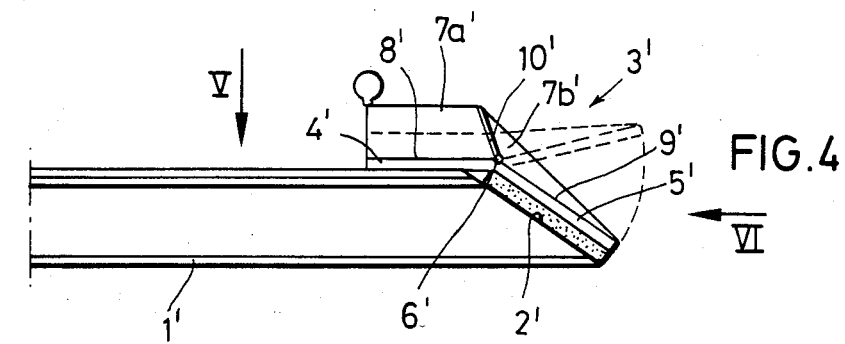
FIG. 4 is a side view of a further embodiment of the invention.
Figure 6:
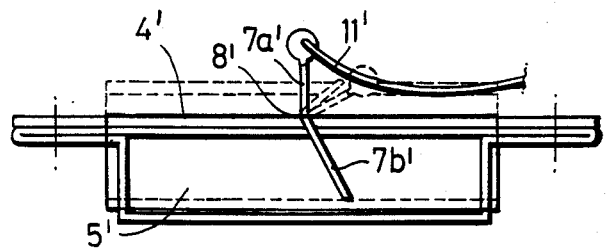
FIG. 6 is a view in the direction of arrow VI in FIG. 4.

In FIGS. 4, 5 and 6, the actuating element 7b' is disposed obliquely upon the closure flap 5' allowing the closure flap 5' to open to the position shown in dotted lines in FIGS. 4, 5 and 6.

Figure 8:
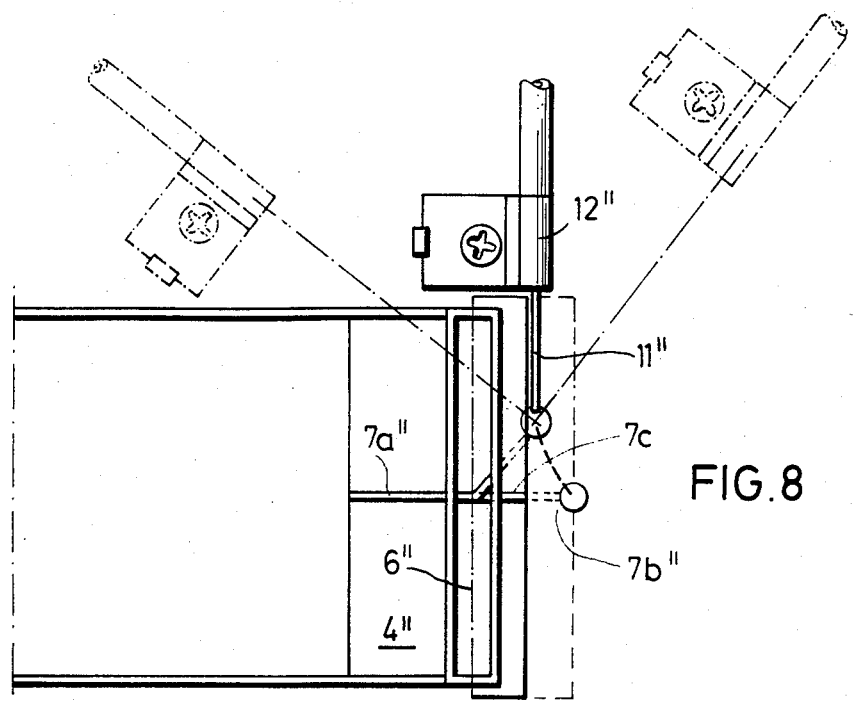
FIG. 8 is a view in the direction of arrow VIII of FIG. 7.
Figure 7:
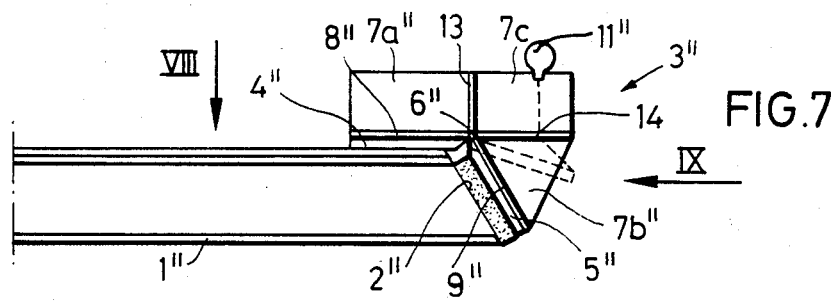
FIG. 7 is a side view of a further embodiment of the invention.
Figure 9:
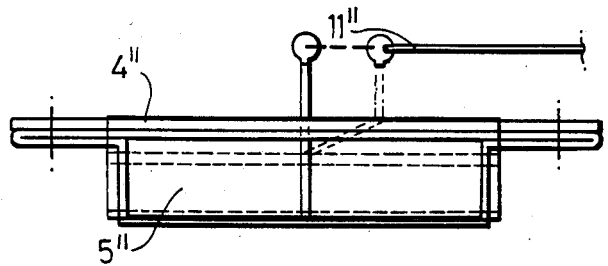
FIG. 9 is a view in the direction of arrow IX in FIG. 7.

In FIGS. 7, 8 and 9, the actuating element 7c is supported upon a fin 7a'' projecting from the plate 4''. The actuating element 7c is hinged along the film hinge 13 and along the film hinge 14. The actuating element 7b'' is hinged relative to the actuating element 7c along the film hinge 14 and is hinged relative to the closure flap 5 along the film hinge 9″.

Instead of a Bowden cable, a handle or other adjusting device may directly engage the actuating element. A handle of this type may advantageously be constructed as a sliding lever also formed integrally with the actuating elements and connected to the latter by way of film hinges.

In the particular embodiments illustrated, the flap mechanism comprises a base plate 4 and a closure flap 5 which are arranged at the end 2 of an air duct 1 and form the latter. The mechanism 3 may alternatively be formed separately and joined to the air duct, for example, by means of screws, clips or catch connections or by welding or adhesion.

As a further alternative, the base plate, the closure flap and the actuating elements may be disposed inside the air duct.

What is claimed is:

1. An arrangement for pivoting a flap about a hinge forming an axis relative to a duct comprising two actuating elements connected to the flap and the duct, respectively, and each pivotable about a hinge forming an axis transverse to the axis of the flap, the two actuating elements being further pivotably connected to one another about a hinge forming a common further axis transverse to the axis of the flap, whereby pivoting of the actuating elements serves to pivot the flap relative to the duct.

2. An arrangement as defined in claim 1, wherein one actuating element is connected pivotably to the duct or the flap by way of a fin projecting from the surface of the duct or flap.

3. An arrangement as defined in claims 1 or 2, wherein each hinge or pivot comprises at least one film hinge.

4. An arrangement as defined in claims 1 or 2, wherein the hinge axes of the actuating elements relative to the flap and the duct lie in a plane normal to the pivotal axis of the flap.

5. An arrangement as defined in claim 3, wherein the hinge axes of the actuating elements relative to the flap and the duct lie in a plane normal to the pivotal axis of the flap.

6. An arrangement as defined in claims 1 or 2, the hinge axis of at least one of the actuating elements lies in a plane obliquely inclined to the pivotal axis of the flap.

7. An arrangement as defined in claim 3, the hinge axis of at least one of the actuating elements lies in a plane obliquely inclined to the pivotal axis of the flap.

8. An arrangement as defined in claims 1 or 2, wherein an adjusting device for altering the position of the flap is connected to an actuating element.

9. An arrangement as defined in claim 3, wherein an adjusting device for altering the position of the flap is connected to an actuating element.

* * * * *